Figure 1:
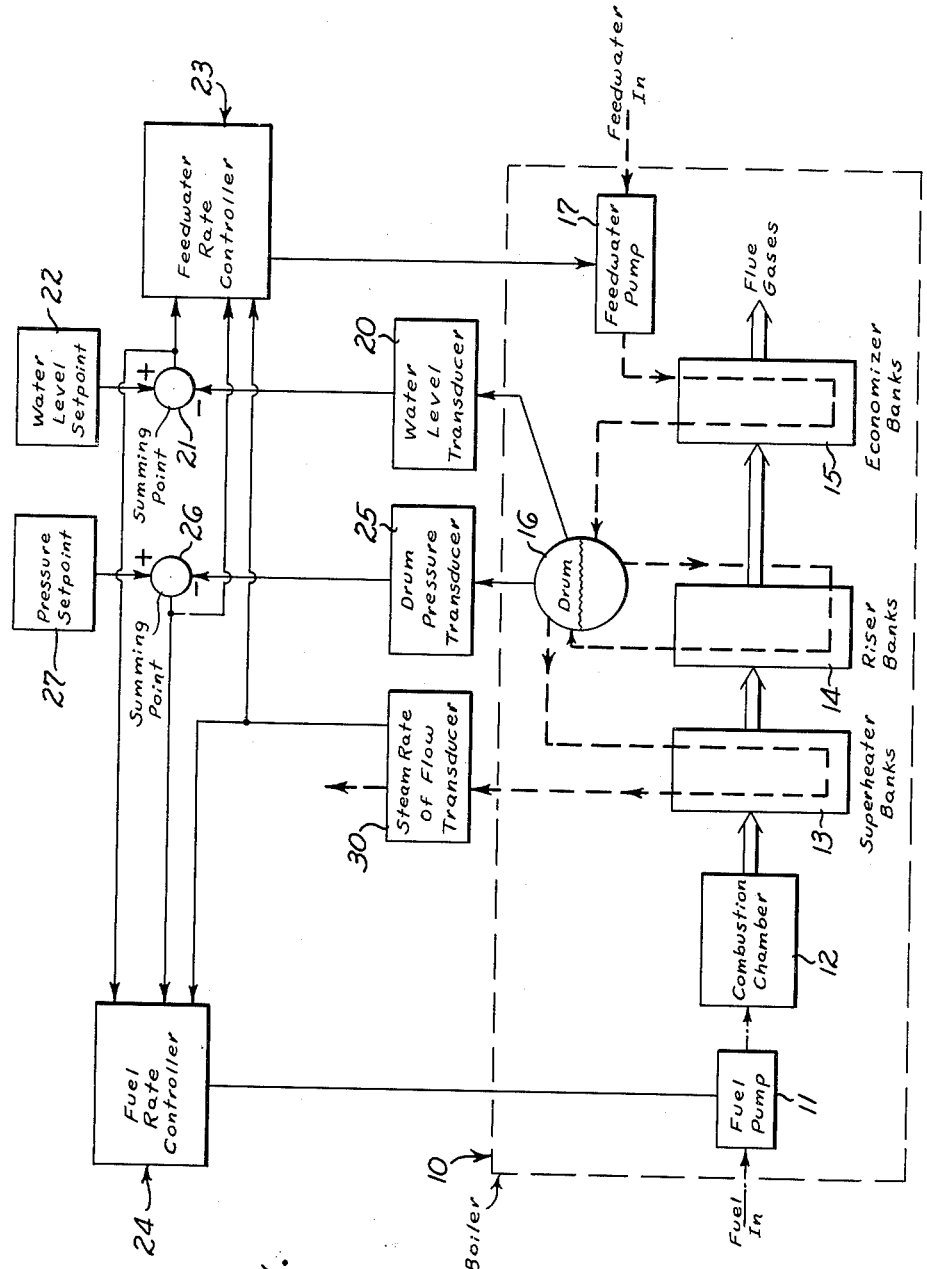

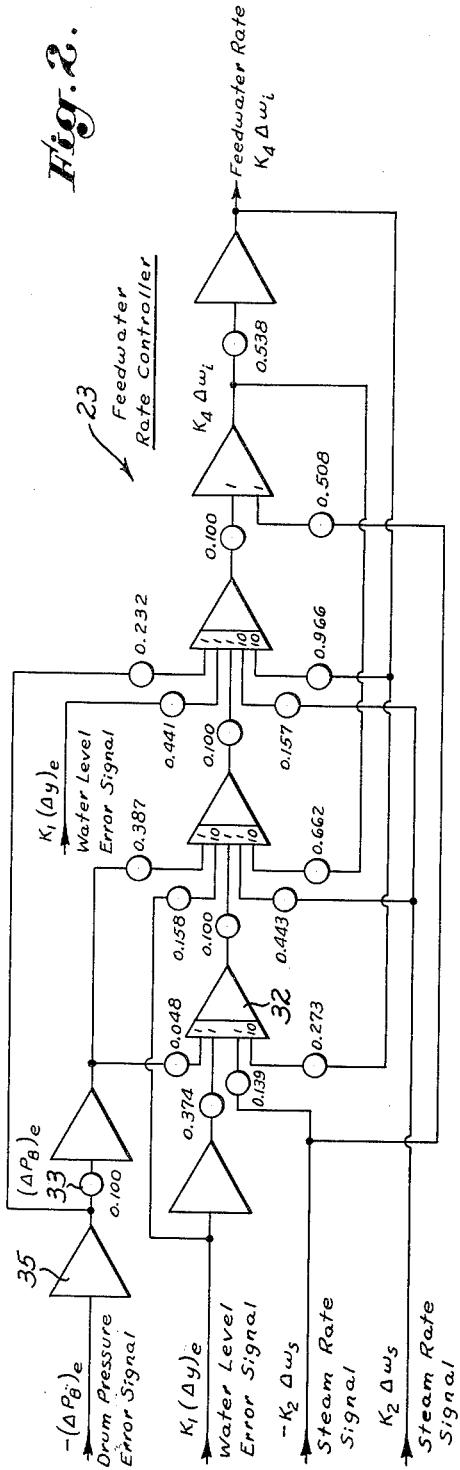
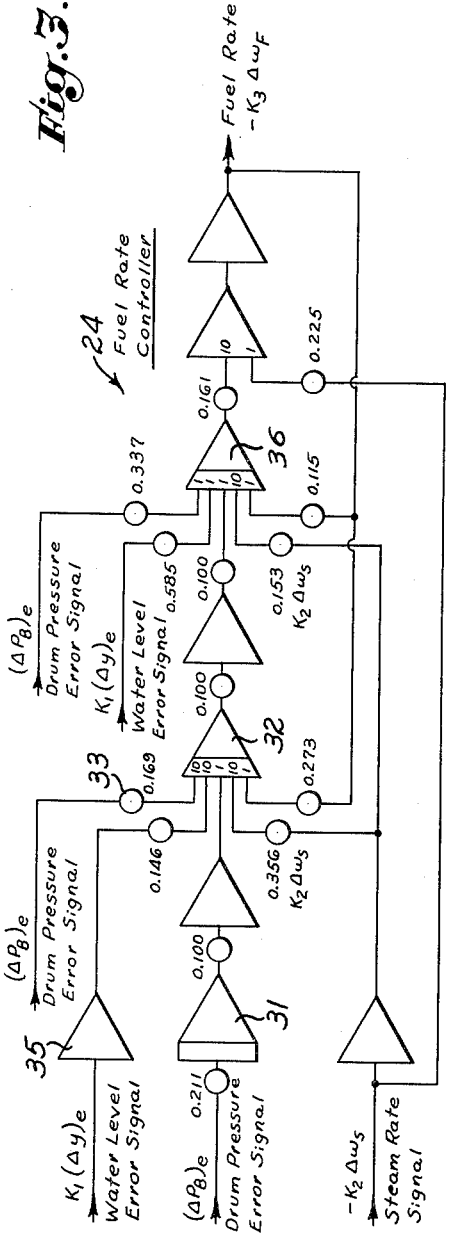

United States Patent Office 3,042,007
Patented July 3, 1962

3,042,007
BOILER CONTROLLER
Kun L. Chien, Fullerton, Erdem I. Ergin, Corona del Mar, and Cheng Ling, Fullerton, Calif., assignors to Beckman Instruments, Inc., a corporation of California
Filed July 28, 1958, Ser. No. 751,419
5 Claims. (Cl. 122—448)

This invention relates to a boiler control system, and, in particular, to a boiler controller suitable for use in controlling a modern, complex, high pressure boiler with the boiler functioning as a unit rather than as a collection of individual pieces of equipment. As used herein, the term "boiler" includes the combustion chamber, the economizer, the superheater, and associated pumps and blowers as well as the drum and tubes.

It has been found that in a boiler, the drum pressure and the drum water level are dependent on the fuel input rate, the feedwater input rate and the steam output rate. The relationships among these three independent variables and two dependent variables are time dependent insofar as a change in any of the independent variables causes a change in one or both of the dependent variables that evolves in time, with the relationships being characteristic of a specific boiler.

In general, the object of any boiler control system is to maintain the drum water level and the drum pressure at predetermined setpoints which are selected based upon a number of considerations including fuel economy, efficiency of the boiler, and the steady-state load.

In a boiler, a change in steam flow rate affects the drum water level as well as the pressure. Similarly a corrective action in feedwater rate in order to bring the water level back to normal will also have an effect on the pressure which will then have to be corrected by adjusting the fuel rate. Because of such interactions, the effectiveness is limited in conventional type boiler controls. In the conventional system, the deviation of the drum pressure from hte setpoint determines the fuel rate, with a high pressure being corrected by a decrease in fuel rate and a low pressure by an increase. Similarly, a deviation in water level from the setpoint determines the feedwater rate with a high water level calling for a lowered feedwater rate and a low level an increase in rate. Due to the interaction of the independent variables and the time dependent relationships in the boiler there will be a sequence of fuel and feedwater rate changes with the magnitudes of the successive deviations diminishing until the system converges into the desired setpoints. Such a system inherently does not provide a rapid response to a change in one variable and does not permit close and continuous adherence to the setpoints. A departure of at least one dependent variable from its setpoint has actually to occur before any corrective steps may be induced.

It is an object of the invention to provide a control system for a boiler which eliminates the chain reaction ordinarily initiated between interacting dependent and independent variables when a single variable is changed, as when a load changes or a predetermined operating condition is changed or there is a deviation in the boiler from a predetermined operating condition. A further object of the invention is to provide a control system for a boiler which does not rely upon departures of the dependent variables from their setpoints for initiating corrective measures but rather one which detects changes in load and initiates control operations for substantially preventing departure of the dependent variables.

It is an object of the invention to provide a control system for a boiler having a plurality of operating setpoints wherein when one of the setpoints is changed, other variable of the boiler are changed so that the new setpoint is attained in a minimum of time without involving a change in the variable associated with the other setpoints.

It is an object of the invention to provide a boiler control system wherein signals representative of steam rate, drum pressure and water level are operated on in a fuel rate controller to provide a control signal for the fuel pump and the same signals are operated on in a feedwater rate controller for controlling the feedwater pump. A further object of the invention is to provide such a system in which changes in the water level setpoint either alone or in conjunction with changes in the drum pressure setpoint may be introduced into the system for changing the steady-state operating conditions of the boiler. A further object of the invention is to provide such a system in which the controllers include computers which are instrumented to provide predetermined transfer functions for the controllers, which transfer functions are defined in terms of the transfer functions of the boiler itself.

It is another object of the invention to provide a control system for a boiler including computers having the steam rate, the drum pressure and the drum water level as inputs and the feedwater rate and fuel rate as outputs with the computer characteristics being predetermined functions of the response characteristics of the boiler producing substantial adherence of drum water level and pressure to their preselected setpoints.

The invention also comprises novel details of construction and novel combinations and arrangements of parts, which will more fully appear in the course of the following description. The drawings show and the description describes a preferred embodiment of the present invention which is given by way of illustration or example.

In the drawings:
FIG. 1 is a schematic representation of a preferred embodiment of the invention;
FIG. 2 is a single line diagram of a feedwater rate controller; and
FIG. 3 is a single line diagram of a fuel rate controller.

FIG. 1 shows a boiler 10 diagrammatically within the dashed line, which may be a conventional water tube boiler having a fuel pump 11, a combustion chamber 12, superheater tube banks 13, riser tube banks 14, economizer tube banks 15, a drum 16 and a feedwater pump 17. The flow of water and steam through the boiler is indicated by the heavy dashed line, the flow of fuel is indicated by the dash-dot line and the flow of hot gases is indicated by the double line.

A water level transducer 20 is connected to the drum 16 and produces a signal which is a function of the water level in the drum, which signal is connected to a summing point 21. The water level transducer may be a conventional unit, such as a potentiometer with an arm actuated by a float in the drum with the potentiometer connected across an electrical source providing a variable voltage at the arm which constitutes the water level signal. A water level setpoint unit 22 provides a water level setpoint signal which is also connected to the summing point 21, with the summing point providing an output to a feedwater rate controller 23 and a fuel rate controller 24 which is the difference between the water level setpoint signal and the water level signal. The water level setpoint unit is variable to select a particular water level in the boiler and may be conventional, such as a potentiometer connected across an electrical power source with the arm being manually movable to provide a variable voltage as the water level setpoint signal.

A drum pressure transducer 25 is connected to the drum 16 to provide a pressure signal which is a function of the pressure in the drum, the signal being connected to a summing point 26. A pressure setpoint unit 27 provides a pressure setpoint signal to the summing point 26 with the output of the summing point connected to the fuel rate controller 24 and the feedwater rate controller 23, this output being a difference between the pressure setpoint signal and the pressure signal. The pressure setpoint unit provides for setting the drum pressure to any desired value, the water level and drum pressure ususally being selected to provide maximum efficiency for a particular operating condition. The pressure setpoint unit and the drum pressure transducer may also be conventional units.

A steam rate of flow transducer 30 is connected in the steam outlet of the boiler and provides a signal which is a function of the rate of flow of steam to the load, the signal being connected to the feedwater rate controller 23 and the fuel rate controller 24. The feedwater rate controller utilizes the three signals previously mentioned as inputs to provide an output for controlling the rate of flow of feedwater into the boiler through the feedwater pump 17. Similarly, the fuel rate controller 24 utilizes the same three input signals to provide an output which controls the rate of flow of fuel to the combustion chamber through the fuel pump 11.

The controllers 23, 24 are instrumented as will be described below to provide control of feedwater and fuel rates which will virtually eliminate fluctuations in drum pressure and water level which normally occur when the steam flow rate is changed. The characteristics of the controllers are based upon the dynamic characteristic of the boiler itself which includes the time dependent relations between the independent variables or boiler inputs, steam rate, feedwater rate and fuel rate, and the dependent variables or boiler outputs, drum pressure and water level. These relations may be obtained in mathematical form by well known methods of dynamic analysis of the boiler itself and will not be described here.

Summarizing briefly the analysis of one particular boiler, flow equations, heat transfer equations, state equations, and equations of rigid body motion were formulated based upon the physical and chemical changes occurring in the boiler together with a number of simplifying assumptions, resulting in a set of eighteen simultaneous equations. This set of equations was then solved to provide the desired relationships.

Conventional transform notation will be used in the following discussion which permits a simplified presentation without loss of accuracy.

The time dependent functional relations between the input and output variables of the boiler provide the following transfer functions:

$$E_{Pi}, E_{PF}, S_{Ps}, E_{yi}, E_{yF}, \text{ and } E_{ys}$$

where P represents drum pressure, $i$ represents feedwater input rate, F represents fuel input rate, $s$ represents steam output rate, and $y$ represents drum water level.

It has been found that a change in drum pressure $P_B$ is dependent upon changes in steam rates $w_s$, feedwater rate $w_i$, and fuel rate $w_F$ which relationship can be expressed in the following form:

$$\Delta P_B = E_{Ps}\Delta w_s + E_{PF}\Delta w_F + E_{Pi}\Delta w_i \quad (1)$$

Changes in water level are also dependent upon the same variables, which relationship can be expressed in the following form:

$$\Delta y = E_{ys}\Delta w_s + E_{yF}\Delta w_F + E_{yi}\Delta w_i \quad (2)$$

The feedwater rate controller and the fuel rate controller are instrumented to change the feedwater rate and fuel rate, respectively, in prescribed manners when the steam rate changes so that neither drum pressure nor drum water level is varied.

The feedwater rate controller 23 which receives three input signals will be characterized by three transfer functions $C_{iP}$, $C_{iy}$, $C_{is}$ which modify the three input signals to provide the proper change in feedwater rate $\Delta w_i$, i.e., the output of the feedwater rate controller is a function of the three inputs which are related as follows:

$$\Delta w_i = C_{iP}(\Delta P_B)_e + C_{iy}(\Delta y)_e + C_{is}\Delta w_s \quad (3)$$

where $(\Delta P_B)_e = \Delta \overline{P}_B - \Delta P_B$ and $(\Delta y)_e = \Delta \overline{y} - \Delta y$ are the signals from the summing points 26 and 21, respectively, with $\Delta \overline{P}_B$ and $\Delta \overline{y}$ being the setpoint signals and $\Delta P_B$ and $\Delta y$ being the transducer signals.

Similarly, the fuel rate controller 24 will be characterized by three transfer functions $C_{FP}$, $C_{Fy}$, $C_{Fs}$ which relate the output $\Delta w_F$ to the three inputs as follows:

$$\Delta w_F = C_{FP}(\Delta P_B)_e + C_{Fy}(\Delta y)_e + C_{Fs}\Delta w_s \quad (4)$$

In instrumenting the controllers, the desired mode of operation for the boiler is achieved by selecting the transfer functions of the controllers so that the drum pressure will not change for any change in steam flow rate and water level and that for a change in pressure setpoint, the drum pressure will respond in a prescribed manner defined by the transfer function $H_p$, which determines how, in terms of time, the drum pressure changes from one steady state condition to the next when the pressure setpoint is changed. The transfer functions of the controllers are also selected so that the drum water level will not change for any change in steam flow rate and drum pressure, and that for a change in the water level setpoint the water level will respond in a prescribed manner defined by the transfer function $H_y$ which determines how, in terms of time, the water level changes from one steady state condition to the next when the water level setpoint is changed.

The time dependent transfer functions E of Equations 1 and 2 are known, being determined by dynamic analysis of the boiler. The controller transfer functions C of Equations 3 and 4 are to be determined. The values of $\Delta w_i$ and $\Delta w_F$ of (3) and (4) can be substituted into (1) and (2) to give:

$$\Delta P_B = (C_{FP}E_{PF} + C_{iP}E_{Pi})(\Delta P_B)_e + (C_{Fy}E_{PF} + C_{iy}E_{Pi})(\Delta y)_e + (E_{Ps} + C_{Fs}E_{PF} + C_{is}E_{Pi})\Delta w_s \quad (21)$$

$$\Delta y = (C_{Fy}E_{yF} + C_{iy}E_{yi})(\Delta y)_e + (C_{FP}E_{yF} + C_{iP}E_{yi})(\Delta P_B)_e + (E_{ys} + C_{Fs}E_{yF} + C_{is}E_{yi})\Delta w_s \quad (22)$$

Then the operating requirements expressed in words in the preceding paragraph may be written in mathematical terms as:

$$E_{Ps} + C_{Fs}E_{PF} + C_{is}E_{Pi} = 0 \quad (23)$$

$$C_{Fy}E_{PF} + C_{iy}E_{Pi} = 0 \quad (24)$$

$$C_{FP}E_{PF} + C_{iP}E_{Pi} = H_P \quad (25)$$

$$E_{ys} + C_{Fs}E_{yF} + C_{is}E_{yi} = 0 \quad (26)$$

$$C_{FP}E_{yF} + C_{iP}E_{yi} = 0 \quad (27)$$

$$C_{Fy}E_{yF} + C_{iy}E_{yi} = H_y \quad (28)$$

The Equations 23–28 are solved simultaneously to provide the following Equations 5–10.

Then the transfer functions of the fuel rate controller 24 are:

$$C_{Fs} = \frac{E_{ys}E_{Pi} - E_{Ps}E_{yi}}{D} \quad (5)$$

$$C_{Fy} = -\frac{H_y E_{Pi}}{D} \quad (6)$$

$$C_{FP} = \frac{H_P E_{yi}}{D} \quad (7)$$

where $D = E_{PF}E_{yi} - E_{Pi}E_{yF}$.

The transfer functions for the feedwater rate controller become:

$$C_{is} = \frac{E_{yF}E_{Ps} - E_{PF}E_{ys}}{D} \quad (8)$$

$$C_{iy} = \frac{H_y E_{PF}}{D} \quad (8)$$

$$C_{iP} = \frac{-H_P E_{yF}}{D} \quad (10)$$

These transfer functions completely define the two controllers. Any conventional computer, preferably of the analog type, can be used as the controllers, the computers being set to perform the operations indicated by the transfer functions on the inputs to produce the indicated outputs for driving the fuel pump and the feedwater pump respectively.

As previously indicated, the transfer functions of the boiler itself are obtained by analysis and/or tests of the boiler with the accuracy of the resultant control system being a function of the accuracy with which the boiler transfer functions are determined.

As indicated above, the drum pressure and water level setpoints may be manually changed by the boiler operator to new values to achieve desired operating conditions, particularly with changes in steam load. In some installations, however, only the water level setpoint is changed for different steam loads, which permits elimination of the manually variable pressure set point unit.

In determining the dynamic characteristic of the boiler, it has been found that the transfer functions relating drum pressure to the independent or input variables can be approximated as single time constant relations, which permits a marked simplification in the instrumenting of the controllers. These three transfer functions then become:

$$E_{PF} = \frac{K_1'}{S+T_1}, E_{Pi} = \frac{K_2'}{S+T_2}, \text{ and } E_{Ps} = \frac{K_3'}{S+T_3}$$

where $K_1'$, $K_2'$ ... are constants, $S$ is the Laplacian operator, and $T_1$, $T_2$ ... are time constants.

It has also been found that the transfer functions relating water level to the independent variables can have certain simplifying approximations made without adversely affecting the accuracy of the boiler control system. The transfer function relating water level to fuel rate may be a double time constant in the form:

$$E_{yF} = \frac{K_4'S + K_5'}{(S+T_1)(S+T_2)}$$

The transfer function relation water level to feedwater rate may be an integrating action in the form:

$$E_{yi} = \frac{K_6'}{S}$$

The transfer function relating water level to steam rate may be a single time constant plus integrating action in the form:

$$E_{ys} = \frac{K_7'S + K_8'}{S(S+T_2)}$$

This simplification of the transfer functions makes the controllers less complex and expensive and more practical to construct and operate, without adversely affecting the operation of the system. As in the design of other control systems, after the dynamic analysis of the plant to be controlled is completed, the relative importance of the various variables is determined and those of lesser effect are omitted. For example, in the embodiment disclosed herein the eighteen simultaneous equations referred to in columns 3, 4 and 5 were solved by an analog computer and the effects of the variables were determined by computing plant performance as the magnitude of a variable was changed. Those variables having little or no effect were omitted in the approximations of the boiler transfer functions above.

As an alternative, the experimental approach can be used wherein the plant is in actual operation and the magnitude of each variable is changed to determine its effect on plant output.

A preferred form of the feedwater rate controller 23 is shown in FIG. 2. This is an analog type computer which has been set up to solve Equation 3 using Equations 8, 9 and 10 and the transfer functions of a boiler. Such computers are well known and, for example, are described in "Electronic Analog Computer," a book written by G. A. and T. M. Korn and published by McGraw-Hill in 1952.

FIG. 3 shows a similar analog type computer set up as the fuel rate controller 24 for solving Equation 4 using Equations 5, 6 and 7 and the boiler transfer functions.

Conventional symbols are used in FIGS. 2 and 3 with the inputs and outputs identified as in FIG. 1. The amplifier 35 is a unity gain amplifier, as are the other amplifiers shown by the same symbol. Such amplifiers are used for circuit isolation and/or sign reversal. Amplifier 31 is an integrating amplifier as are the other amplifiers having the internal vertical line. Amplifier 32 and the others shown by the same symbol, are summing amplifiers, with the amplification of each input indicated by the corresponding numeral. As shown by the symbols, some of the amplifiers do both integrating and summing. The circles, such as circle 33, indicated signal voltage dividers, with the output-input ratio designated by the adjacent number. The amplifier gains, the divider ratios and the factors $K_1$–$K_4$ are dependent upon the characteristics of the particular boiler being contolled.

The fuel rate controller of FIG. 3 receives its input signals, which consist of the drum steam pressure, the drum water level and the steam flow rate, in a form suitable for computation media; that is, in an electrical form for an electrical or electronic controller, and in the pneumatic form for a pneumatic controller. The signals of the drum pressure and the drum water level are compared with their respective set points either in a pneumatic relay or in an electronic device of similar functional character so that pressure and water level error signals are developed as being equal to the difference between the respective set points and the actual measured values, as indicated at 21 and 26 of FIG. 1.

These three signals (pressure error, water level error, and steam flow rate) come to the fuel rate controller with proper settings for a particular boiler. The computer section of the fuel rate controller is designed to realize physically the computer transfer functions $C_{FP}$, $C_{Fy}$, and $C_{Fs}$. Observation of these controller functions indicates that only two different types of operation appear. These are:

(a) Proportioning and summing (proportional action)
(b) Proportioning, summing, and integrating (reset action)

The first operation can mathematically be described as:

$$Z = a_1x_1 + a_2x_2 + a_3x_3 + a_4x_4 + \text{etc.}$$

where $x_1$, $x_2$, $x_3$, $x_4$, are variables to be summed in proportion to the constants $a_1$, $a_2$, $a_3$, $a_4$, etc., such that the summation results in a new variable ($Z$) which may also be used in another summing or reset action.

The second operation can mathematically be described as:

$$Z = \int (a_1x_1 + a_2x_2 + a_3x_3 + a_4x_4 + \text{etc.} + bZ)dt$$

which states that the proportioned and summed variables can be integrated with respect to time, and that such integration may include the final desired variable ($Z$) shown in the equation as a proportionate term ($bZ$). In a more convenient form (which is a well-established mathematical technique called Laplace transformations) each integral sign can be replaced by $$\left(\frac{1}{S}\right)$$

where S is known as the Laplace operator. Thus:

$$Z = \frac{1}{S}(a_1x_1 + a_2x_2 + a_3x_3 + a_4x_4 + \text{etc.} + bZ)$$

or $$SZ = a_1x_1 + a_2x_2 + a_3x_3 + \ldots + bZ$$

Since electronic analog computer elements were used to illustrate the principle of synthesizing the controller, two more considerations should be pointed out:

(1) Proportionality constants ($a_1$, $a_2$, $a_3$, . . . etc.) are obtained by using electrical potentiometers in conjunction with the gain (or multiplication) setting of the amplifiers. For example, the proportional constant (3.56) can be generated by setting a potentiometer at (0.356) and the amplifier gain at (10). (Note: potentiometers can only give fractions of unity); similarly for a proportional constant 0.273, the potentiometer is set at 0.273 and the amplifier gain at unity (that is, 1) for that particular input signal. Pneumatically, the proportionality constants can be obtained by using proportional relays or computing relays.

(2) In an electronic analog system, every amplifier (summing or integrating) reverses the sign of the input. For a summing amplifier, the output will be ($-Z$) if the input is $a_1x_1 + a_2x_2 + a_3x_3 + a_4x_4 + \text{etc.}$ Hence, an amplifier with a single input serves as a sign inverter. For example, in FIG. 3 water level error signal $K_1(\Delta y)_e$ goes into the amplifier 35; the output of the amplifier 35 will be $-K_1(\Delta y)_e$. The same sign reversal (or sign inversion) applies to integrators.

In FIGS. 2 and 3, the circles (such as 33) indicate potentiometers with their particular settings written above, the triangles with single base line are summing devices or inverters (such as 35), and the triangles with double base lines are integrators (such as 31 and 32). The numbers written at the base of the triangles are the gain settings (or multiplication factors) for that particular input. If no number is shown, the gain is taken to be equal to one.

To follow the synthesis of the fuel rate controller, reference should be made to FIG. 3. For the sake of simplicity, it will be shown that FIG. 3 does represent the proper controller transfer functions between pressure error signal and fuel rate ($C_{FP}$), between water level error signal and fuel rate ($C_{Fy}$), and between steam flow rate and fuel rate ($C_{FS}$). The mathematical derivation of these transfer functions was explained previously in the specification.

The transfer function $C_{FP}$ will be obtained first from FIG. 3 and shown that the other two transfer functions can be derived in a similar manner proving the fact that FIG. 3 does indeed represent functionally the required relations between the disturbance (steam flow rate), the controlled (pressure water level) and the controlling (fuel rate) variables.

To determine $C_{FP}$ it is sufficient to consider only the fuel rate ($\Delta w_F$) and pressure error ($\Delta P_B$)$_e$ variables.

The pressure error signal (henceforth referred to only as $(\Delta P_B)_e$) is first multiplied by a constant 0.211 and then integrated in the integrating device 31. Thus, the signal at the output of integrator 31 becomes:

(a) $\qquad -0.211\frac{1}{s}(\Delta P_B)_e$

This signal is once more multiplied by a constant of (0.100) and its sign is inverted when it goes through the next amplifier. As a result, its value as it enters the integrator 32 becomes:

(b) $\qquad +0.0211\frac{1}{s}(\Delta P_B)_e$

At this device $(\Delta P_B)_e$ signal is once more added through a multiplication factor at 1.69 (potentiometer 33 set at 0.169 and the gain at 10), together with the fuel rate signal of $-K_3\Delta w_F$ through a multiplication factor (0.273). Thus, ignoring the signals of $(\Delta y_e)$ and $(\Delta w_s)$ since we are interested only in developing the transfer function $C_{FP}$, the three signals (($\Delta P_B)_e$, $-K_3\Delta w_F$, and the Equation b) are summed in their respective proportions and integrated. The output signal of integrating device 32 will then be:

(c)
$$-\frac{1}{s}\left[0.0211\frac{1}{s}(\Delta P_B)_e + 1.69(\Delta P_B)_e - 0.273K_3\Delta w_F\right]$$

The signal c is multiplied by a constant 0.100, its sign inverted when it goes through the next amplifier, and again multiplied by a constant 0.100. Thus, at the input to the integrating device 36 it becomes:

(d)
$$+\frac{0.100 \times 0.100}{s}\left[\left(\frac{0.0211}{s} + 1.69\right)(\Delta P_B)_e - 0.273K_3\Delta w_F\right]$$

or simplifying this expression:

(e) $\left(\frac{0.000211}{s^2} + \frac{0.0169}{s}\right)(\Delta P_B)_e - \frac{0.00273}{s}K_3\Delta w_F$ At this integrator 36, again two signals are added (once more neglecting $(\Delta y)_e$ and $\Delta w_s$); the signal of $(\Delta P_B)_e$ through a multiplication factor of 0.337, and the signal of $-K_3\Delta w_F$ through a multiplication factor of 0.115. The total sum is integrated so that the output signal from the device 36 becomes:

(f)
$$-\frac{1}{s}\left[\left(\frac{0.000211}{s^2} + \frac{0.0169}{s}\right)(\Delta P_B)_e - \frac{0.00273}{s}K_3\Delta w_F\right.$$
$$\left. + 0.337(\Delta P_B)_e - 0.115K_3\Delta w_F\right]$$

Simplifying it once again:

(g)
$$-\left(\frac{0.000211}{s^3} + \frac{0.0169}{s^2}\right) + \frac{0.337}{s}\right)(\Delta P_B)_e$$
$$+ \left(\frac{0.00273}{s^2} + \frac{0.115}{s}\right)K_3\Delta w_F$$

This output signal of the device 36 is then multiplied by a factor of (1.61) and its sign reversed twice when it goes through the two following amplifiers. The reversal of its sign twice means that it will have the same sign as that given in expression g. However, the output of the last amplifier must be equal to the required fuel rate which is $-K_3\Delta w_F$. Thus, an equation can be written as:

(h)
$$1.61\left[-\left(\frac{0.000211}{s^3} + \frac{0.0169}{s^2} + \frac{0.337}{s}\right)(\Delta P_B)_e\right.$$
$$\left. + \left(\frac{0.00273}{s^2} + \frac{0.115}{s}\right)K_3\Delta w_F\right] = -K_3\Delta w_F$$

multiplying this expression through by $s^3$ and dividing by 1.61, it can be simplified to:

(i) $-(0.000211 + 0.0169s + 0.337s^2)(\Delta P_B)_e$
$\qquad + (0.00273s + 0.115s^2)K_3\Delta w_F = -0.621s^3 K_3\Delta w_F$ The Equation i can be further simplified by rearranging the terms. Thus:

(j) $(0.621s^3 + 0.115s^2 + 0.00273s)K_3\Delta w_F$
$\qquad = (0.337s^2 + 0.0169s + 0.000211)(\Delta P_B)_e$ The controller transfer function ($C_{FP}$) was defined as $$\frac{w_F}{(\Delta P_B)_e}$$

Hence, writing expression $j$ in this fractional form and multiplying its numerator and denominator by 100 (which, of course, does not affect its value at all), the required controller transfer function is found to be:

(k) $\quad C_{FP} = \frac{1}{K_3} \frac{33.7s^2 + 1.69s + 0.0211}{s(62.1s^2 + 11.55 + 0.273)}$ which is in exactly the same form as that derived mathematically. A similar procedure can be used to derive transfer functions $C_{Fy}$, $C_{Fs}$, $C_{iP}$, $C_{iy}$, and $C_{is}$ and show that the particular organization of the computing devices given in FIGS. 2 and 3 will indeed satisfy the requirements of the controller.

A reverse procedure was utilized in the foregoing explanation in order to show that the controllers as shown in FIGS. 2 and 3 are sufficient to give the desired functions. In actual practice, the controllers would be synthesized after the derivation of the controller transfer functions $C_{FP}$, $C_{Fy}$, $C_{Fs}$, $C_{iP}$, $C_{iy}$, and $C_{is}$. The technique of the synthesis is a well-known and established technique for electronic analog computers and can be found in the text reference previously cited in the specification.

While the boiler control of the system of the invention has been described herein in conjunction with a particular water tube boiler, it will be understood that the invention is not restricted to this particular type of boiler. The embodiment disclosed may be subjected to various changes, modifications and substitutions without necessarily departing from the spirit of the invention.

We claim as our invention:

1. In a control system for a boiler having a steam outlet, a drum, fuel pumping means for supplying fuel, and feedwater pumping means for supplying feedwater, the combination of: first transducer means positioned in the steam outlet for producing a steam rate signal as a function of rate of flow of steam to a load; second transducer means positioned in the drum for producing a first pressure signal as a function of the pressure in the drum; third transducer means positioned in the drum for producing a first water level signal as a function of the water level in the drum; means for producing a pressure setpoint signal; means for producing a water level set-point signal; first summing means for producing a second pressure signal which is the difference between said pressure setpoint signal and said first pressure signal; second summing means for producing a second water level signal which is the difference between said water level setpoint signal and said first water level signal; a fuel rate controller having means for varying the rate of flow of fuel from the fuel pumping means in response to variations in the inputs to such controller; means for coupling only said steam rate, second pressure and second water level signals to said fuel rate controller as inputs; means for coupling the output of said fuel rate controller to the fuel pumping means in controlling relationship; a feedwater rate controller having means for varying the rate of flow of feedwater from the feedwater pumping means in response to variations in the inputs to such controller; means for coupling only said steam rate, second pressure and second water level signals to said feedwater rate controller as inputs; and means for coupling the output of said feedwater rate controller to the feedwater pumping means in controlling relationship.

2. In a control system for a boiler having a steam outlet, a drum, fuel pumping means for supplying fuel, and feedwater pumping means for supplying feedwater, the combination of: first transducer means positioned in the steam outlet for producing a steam rate signal as a function of rate of flow of steam to a load; second transducer means positioned in the drum for producing a pressure signal as a function of pressure in the drum; third transducer means positioned in the drum for producing a first water level signal as a function of water level in the drum; means for producing a water level setpoint signal; summing means for producing a second water level signal which is the difference between said water level setpoint signal and said first water level signal; a fuel rate controller having means for varying the rate of flow of fuel from the fuel pumping means in response to variations in the inputs to such controller; means for coupling said steam rate, pressure and second water level signals to said fuel rate controller as inputs; means for coupling the output of said fuel rate controller to the fuel pumping means in controlling relationship; a feedwater rate controller having means for varying the rate of flow of feedwater from the feedwater pumping means in response to variations in the inputs to such controller; means for coupling said steam rate, pressure and second water level signals to said feedwater rate controller as inputs; and means for coupling the output of said feedwater rate controller to the feedwater pumping means in controlling relationship.

3. In a control system for a boiler having a steam outlet, a drum, fuel pumping means for supplying fuel, and feedwater pumping means for supplying feedwater, the dynamic characteristic of the boiler being described by the transfer functions $E_{Pi}$, $E_{PF}$, $E_{Ps}$, $E_{yi}$, $E_{yF}$, and $E_{ys}$, where P represents drum pressure, $i$ represents feedwater input rate, F represents fuel input rate, $s$ represents steam output rate, and $y$ represents drum water level, the combination of: first transducer means positioned in the steam outlet for producing a steam rate signal as a function of rate of flow of steam to a load; second transducer means positioned in the drum for producing a first pressure signal as a function of pressure in the drum; third transducer means positioned in the drum for producing a first water level signal as a function of water level in the drum; means for producing a pressure setpoint signal, the time response of the boiler to a change in the pressure setpoint having the transfer function $H_P$; means for producing a water level setpoint signal, the time response of the boiler to a change in the water level setpoint having a transfer function $H_y$; first summing means for producing a second pressure signal which is the difference between said pressure setpoint signal and said first pressure signal; second summing means for producing a second water level signal which is the difference between said water level setpoint signal and said first water level signal; a fuel rate controller having means for varying the rate of flow of fuel from the fuel pumping means in response to variations in the inputs to such controller; means for coupling said steam rate, second pressure and second water level signals to said fuel rate controller as inputs; means for coupling the output of said fuel rate controller to the fuel pumping means in controlling relationship, the transfer functions of said fuel rate controller being:

$$C_{Fs} = \frac{E_{ys}E_{Pi} - E_{Ps}E_{yi}}{D}$$

$$C_{Fy} = \frac{H_y E_{Pi}}{D}$$

$$C_{FP} = \frac{H_P E_{yi}}{D}$$

where $D = E_{PF}E_{yi} - E_{Pi}E_{yF}$; a feedwater rate controller having means for varying the rate of flow of feedwater from the feedwater pumping means in response to variations in the inputs to such controller; means for coupling said steam rate, second pressure and second water level signals to said feedwater rate controller as inputs; and means for coupling the output of said feedwater rate controller to the feedwater pumping means in controlling relationship, the transfer functions of said feedwater rate controller being:

$$C_{is} = \frac{E_{yF}E_{Ps} - E_{PF}E_{ys}}{D}$$

$$C_{iy} = \frac{H_y E_{PF}}{D}$$

$$C_{iP} = \frac{-H_P E_{yF}}{D}$$

4. A control system as defined in claim 3 in which the boiler transfer functions are given the following forms:

$E_{PF}$ a single time constant $$\frac{K_1'}{S+T_1}$$

$E_{Pl}$ a single time constant $$\frac{K_2'}{S+T_2}$$

$E_{Ps}$ a single time constant $$\frac{K_3'}{S+T_3}$$

$E_{yF}$ two time constants $$\frac{K_4'S + K_5'}{(S+T_1)(S+T_2)}$$

$E_{yl}$ integrating action $$\frac{K_6'}{S}$$

and $E_{ys}$ a single time constant and integrating action $$\frac{K_7'S + K_8'}{S(S+T_2)}$$

5. In a control system for a boiler in which the drum pressure and the drum water level are each dependent on the steam output rate, the fuel input rate and the feedwater input rate, the combination of: means for setting a water level setpoint; means for setting a drum pressure setpoint; first transducer means for measuring the steam rate of the boiler; second transducer means for measuring the deviation of the actual water level of the boiler from said water level setpoint; third transducer means for measuring the deviation of the actual drum pressure of the boiler from said drum pressure setpoint; first output means for controlling the feedwater input rate; second output means for controlling the fuel input rate; a first group of three computers with the output of a transducer connected to each of the computers respectively as an input, each of said computers comprising means for generating computer outputs in time dependent relationship to the associated input; means for coupling the outputs of said first group of computers to said first output means as a single input; a second group of three computers with the output of a transducer connected to each of the computers respectively as an input, each of said computers comprising means for generating computer outputs in time dependent relationship to the associated input; and means for coupling the outputs of said second group of computers to said second output means as a single input.

References Cited in the file of this patent

UNITED STATES PATENTS

| | | |
|---|---|---|
| 2,258,719 | Saathoff | Oct. 14, 1941 |
| 2,273,629 | Dickey | Feb. 17, 1942 |
| 2,842,311 | Petrie | July 8, 1958 |

OTHER REFERENCES

"Automatic Data Logging—a Step Closer to the Automatic Plant," Power, vol. 101, April 1957, pages 73 to 79.

UNITED STATES PATENT OFFICE
CERTIFICATE OF CORRECTION

Patent No. 3,042,007            July 3, 1962

Kun L. Chien et al.

It is hereby certified that error appears in the above numbered patent requiring correction and that the said Letters Patent should read as corrected below.

Column 1, line 39, for "hte" read -- the --; column 2, lines 2 and 4, for "variable", each occurrence, read -- variables --; column 3, line 57, the equation should appear as shown below instead of as in the patent:

$$E_{Pi}, E_{PF}, E_{Ps}, E_{yi}, E_{yF}, \text{ and } E_{ys}$$

column 5, line 7, for "(8)" read -- (9) --; line 52, for "relation" read -- relating --; column 6, line 34, for "contolled" read -- controlled --; column 8, line 9, for "$-K_3 \Delta w_P$" read -- $-K_3 \Delta w_F$ --; lines 46 to 51, the equation should appear as shown below instead of as in the patent:

$$-(\frac{0.000211}{s^3} + \frac{0.0169}{s^2} + \frac{0.337}{s}) (\Delta P_B)_e + (\frac{0.00273}{s^2} + \frac{0.115}{s}) K_3 \Delta w_F$$

column 9, line 46, for "set-point" read -- setpoint --.

Signed and sealed this 20th day of November 1962.

(SEAL)
Attest:
ERNEST W. SWIDER
Attesting Officer

DAVID L. LADD
Commissioner of Patents